April 14, 1942.   H. E. SIPE   2,279,954
SHAFTING CONNECTION
Filed April 28, 1941   2 Sheets-Sheet 2

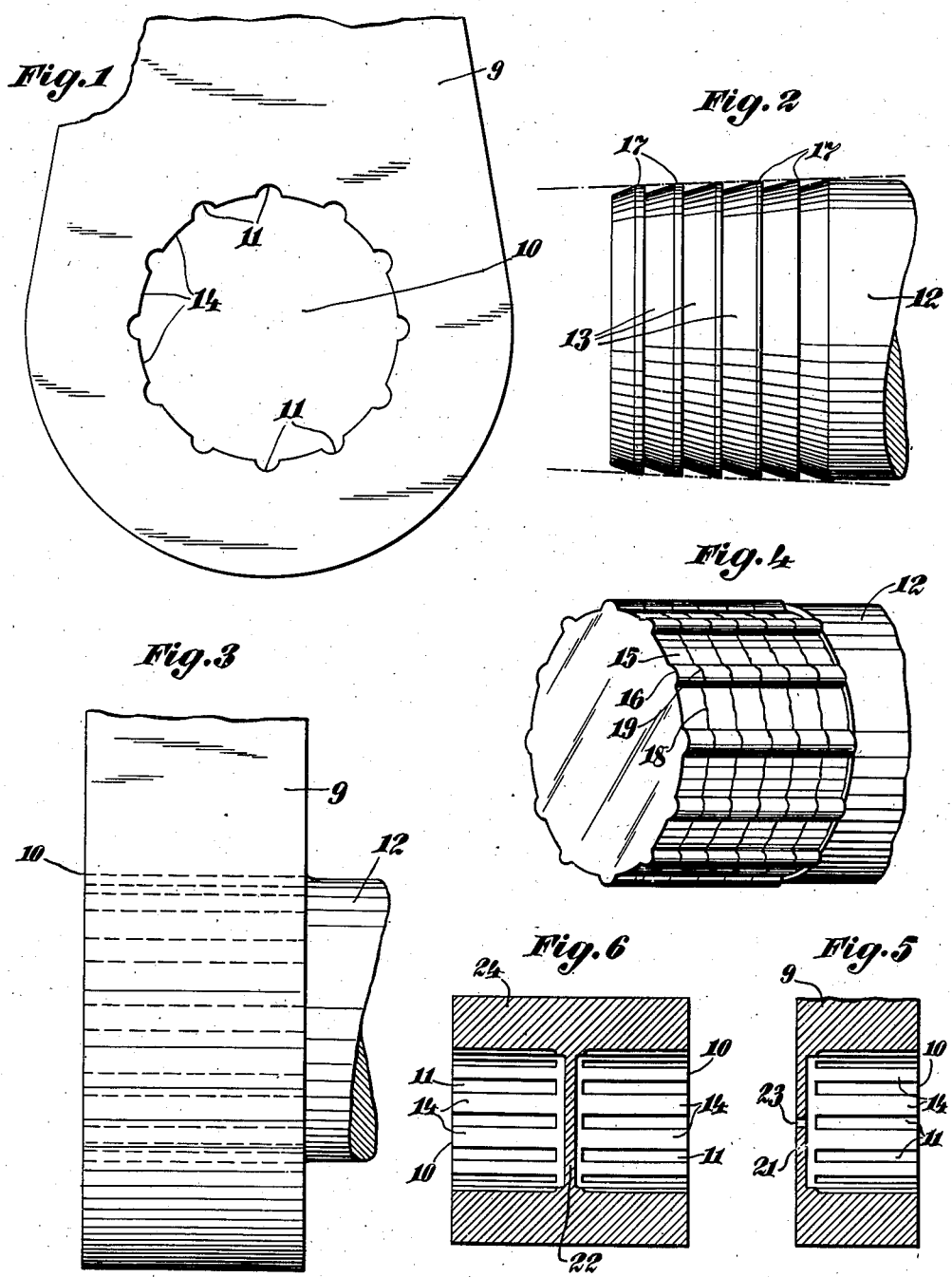

Harry E. Sipe,
INVENTOR.

BY

ATTORNEY.

Patented Apr. 14, 1942

2,279,954

UNITED STATES PATENT OFFICE 2,279,954

SHAFTING CONNECTION

Harry E. Sipe, New York, N. Y.

Application April 28, 1941, Serial No. 390,650

8 Claims. (Cl. 287—53)

The invention here disclosed relates to shafting connections in general and more particularly to where the parts are subjected to heavy torsional stress, as in the case of the crank shafts of Diesel engines and the like.

Objects of the invention are to provide a connection fully capable of carrying heavy torsional loads, which can be made up with a simple press engagement, in any desired angular relation, which will be of simple, inexpensive construction, readily assembled, requiring no specially great accuracy and hence meeting the need of interchangeability of parts and suited to mass production.

Other desirable objects and results following from the invention will appear as the specification proceeds.

The novel features of the invention by which the objects are attained are hereinafter set forth in detail, illustrated by way of example in the accompanying drawings and broadly covered in the claims.

In the drawings, there are illustrated several of the present preferred embodiments of the invention, but structure may be modified and changed as regards the present disclosure all within the true intent and broad scope of the invention as hereinafter defined and claimed.

Fig. 1 is a broken face view illustrating one of the members to be connected such as the crank throw of an engine shaft and which in this case is the member having the specially formed torque coupling socket.

Fig. 2 is a broken side elevation of the companion member of the connection, in this instance, the shaft element, ridged to cooperatively interlock and key into the fluted socket of the first member.

Fig. 3 is a broken side elevation of the parts interlocked by a simple press engagement.

Fig. 4 is a broken perspective view illustrating the general appearance of the circumferentially ridged shaft member as reformed by its press engagement in the fluted socket of the other member into longitudinal keys fitting and filling the longitudinal grooves of the socket.

Fig. 5 is a cross sectional detail illustrating the feature of retaining a cross wall to strengthen the socket of the first member.

Fig. 6 is a similar view of a structure such as may be used as a shaft coupling with an intermediate wall retained for reinforcing sockets at opposite sides of the same.

Figure 7:
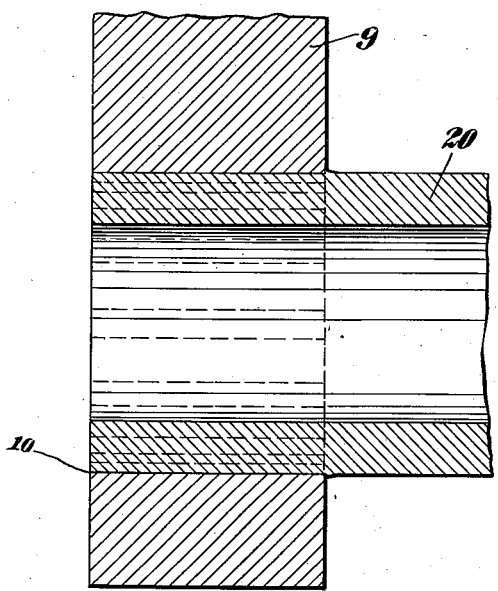
Fig. 7 is a broken sectional view of a connection such as for a crank throw on a length of hollow shafting.

In Figs. 1 and 2, the companion elements of a torsional connection embodying the invention are shown incorporated in a crank throw and shaft combination, in which the throw or web structure 9, has a cylindrical socket 10, longitudinally fluted or grooved at 11, and the shaft member 12, has circumferential tapered ridges 13, of successively greater diameters and slightly larger than the socket, such that under the pressure of being driven into the socket, the metal of the ridges will be compressed by the fillets 14, into the generally cylindrical arcuate lands 15, and displaced radially outwardly into the substantially continuous longitudinal ribs or keys 16, filling the flutes or grooves 11.

The key forming grooves 11, are readily formed in the socket member by a simple broaching operation and the conical ridges on the shaft member may be produced by rolling or turning operations.

The increase in diameter of successive tapers, the incline of the tapers and the extent of the plinth 17, Fig. 2, at the base of each conical section will depend upon and may be determined to an extent by the resilience, compressibility and other characteristics of the metal.

In a simple drive form of fastening embodying the principle of successive deformable conical ridges, but not specially designed to carry heavy torque loads, as disclosed in Harry E. Sipe Patent 2,028,528 of Jan. 21, 1936, a slope of approximately twenty degrees was found suitable for the successive tapered steps and the overall longitudinal taper of the entire pin was usually about four degrees.

These proportions may be generally followed in the present invention but this is by way of illustration, rather than limitation, as it is realized different materials and conditions to be met, may require wide variance from these figures.

The showing in the drawings also is to be considered as illustrative and possibly somewhat exaggerated, as in practice, the keyway forming grooves or flutes 11, may be much shallower and on wider arcs than indicated, to permit the more ready flow of the key forming metal at 16, Fig. 4.

The pressure of driving the tapered member into the smaller sized fluted socket has the effect of compressing and reducing the plinths 17, of Fig. 2, and flattening and extending them longitudinally as at 15, Fig. 4, merging them on the lines 18, into substantially continuous cylindrical surfaces in continuous engagement with the cylindrical fillets 14, of Fig. 1. Similarly, the metal displaced circumferentially and radially outwardly into the longitudinal ridges 16, Fig. 4, merges at 19, into substantially continuous longitudinal keys completely filling the flutes or grooves 11, of the socket member.

The deformable tapered ridges, if produced by a rolling action, may be made in a rotary die machine like that disclosed in the Harry E. Sipe Patent 2,058,520 of October 27, 1936, in which a rotary die rolls the stock against a stationary die face to displace the metal outwardly in cones of approximately the same slope but of successively greater diameters, with plinths at the bases of the cones of successively less width and with the grooves at the backs of the cones of successively greater depth, inward from the end of the stock.

The rolled form of frusto-conical ridges may be preferred, over the turned or cut form of ridges and the rolled form is feasible and practical when operating with solid shafting.

The invention is shown applied to tubular shafting 20, in Fig. 7, and this differs from the form of connection shown in Fig. 3, primarily in that the deformable conical ridges are turned instead of rolled in the shafting, so as to avoid any possibility of injuring or unduly stressing the hollow structure in the formation of such ridges.

If it be considered desirable to reinforce the socket member, a cross wall or partition may be left in the socket such as represented at 21, in Fig. 5 and at 22, in Fig. 6.

In Fig. 5, the body having the socket formed therein may be considered as the crank arm 9, of Figs. 1 and 3, modified to the extent of having the connecting wall 21, left across the back of the socket.

One or more relief openings, such as indicated at 23, may be provided in the transverse reinforcing wall or partition, particularly for escape of lubricant which may be used when the parts are pressed together.

The socket member of the connection represented in Fig. 6, may be considered as a coupling 24, for connecting opposing ends of two lengths of shafting, it being shown as having the fluted sockets 10, 10, in opposite ends of the same to receive the circumferentially ridged ends of the two pieces of shafting and with the intermediate reinforcing partition 22, left between the two sockets.

Figure 8:
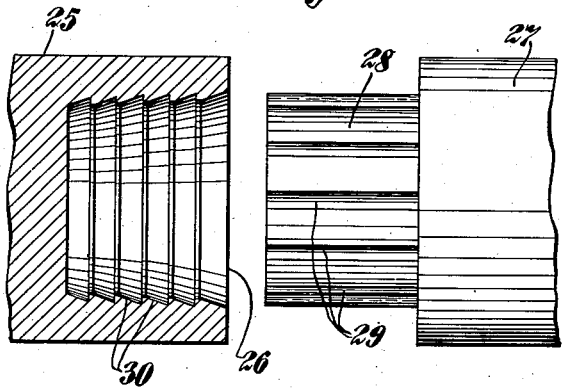
Fig. 8 is a broken part sectional detail illustrating an embodiment for directly coupling shaft ends and with the companion parts reversed, that is, with the circumferential tapers provided in the socket and with the key forming grooves in the member which is press fitted into the socket.

Fig. 8 illustrates a form of the invention adapted for directly connecting two opposing ends of shafting and also illustrates the point that the relation of the conforming and deformable elements may be reversed, that is the circumferential deformable tapers be formed in the socket and the longitudinal key forming grooves or flutes be provided on the member which enters the socket.

In Fig. 8, the end of one length of shafting is indicated at 25, having a socket 26, formed directly in the end of the same and the opposing length of shafting 27, is shown as having an integral projection 28, on the end of the same to fit with an interlocking press engagement in such socket.

In this particular illustration however, the flutes or grooves 29, which shape up and receive the keying elongations on the other member, are provided in the outer surface of the projecting or entering element 28, and the succession of circumferential tapers 30, are formed on the interior of the socket, with the taper or conical ridge element of greatest diameter at the outer end and the smallest one of the series at the inner end, so that in the final structure, the results will be substantially the same as heretofore illustrated and described, the successive diameters substantially compensating for such abrasion and reduction as results under the pressure of assembling the members.

The companion members of the joint are relatively simple and inexpensive to manufacture and can be made up in quantity and with complete interchangeability of parts. These companion members will go together in any desired angular relation, since the keys which lock the parts against relative rotation only form up as the metal is forced to flow under the pressure of forcing the larger size member into the smaller size socket.

While shown applied to crank shafts and couplings, it will be appreciated that the invention may be applied to and used with many other forms of shafting parts or in fact, wherever parts are to be connected together with a torque resisting joint and while as a general rule, metals having the compressibility and resiliency of carbon and cold rolled steels may be preferred, it should be understood that the invention may be used with many other metals or materials.

What is claimed is:

1. A shafting connection, comprising companion members, one having a socket and the other a projection to enter the socket with a drive fit, one of said members having keyway forming grooves extending longitudinally in respect to the axis of the shafting and the other member having a succession of transverse tapers deformable as keys into said grooves.

2. A shafting connection, comprising a member having a cylindrical socket with spaced longitudinal flutes in the cylindrical wall of the same and a shaft member having a series of successively larger circumferentially extending ridges each inclined convergently toward the end of said shaft member and sized to enter said socket with a driving fit and to be thereby conformed into interlocking keyed engagement in said longitudinal flutes in the wall of the cylindrical socket.

3. A shafting connection, comprising joined members, one having a socket and the other having a projection press-fitted in said socket, one of said members having longitudinally extending spaced shallow keyways and the other of said members having a succession of annular inclined ridges displaced partly into said longitudinal keyways.

4. A pressed connection, comprising members permanently engaged with a pressed fit one in the other, the surface of drive fit engagement of one of said members being circumferentially grooved and the meeting drive fit engaged surface of the other member being longitudinally grooved.

5. In a torque load shafting connection of the character disclosed, the combination of connected members, one member having a socket extending longitudinally in respect to the axis of said shafting in which the other member is engaged with a driven fit, the contacting surface of one of said members comprising a series of initially spaced successively larger transversely extending portions and the contacting surface of the other member being longitudinally grooved and receiving raised portions of said transversely extending portions displaced by the driven engagement of one member in the other as keys.

6. A crank shaft comprising shaft and crank throw members, the latter having a socket extending longitudinally in respect to the axis of the shaft to receive the former with a drive fit, the contacting surface of one of said members having longitudinal keyways and the contacting surface of the other member having transversely extending conical ridges, portions of said ridges being displaced by pressure of the drive fit to form longitudinal ridges filling said longitudinal keyways.

7. A shafting connection, comprising companion shafting members, one having a projection extending longitudinally in respect to the axis of the shafting and the other having a socket receiving said projection with a drive fit, the engaging portion of one of said members having longitudinally extending shallow grooves spaced circumferentially of the same and the engaging portion of the other member having annular inclined ridges sloped in the direction of engagement of the two members, said ridges being of successively larger diameter and having plinths of successively lesser width.

8. A driven fit connection, comprising companion drive fit engaged members, one fitting within a socket within the other, said first member having a contacting surface circumferentially grooved to form spaced ridges inclined away from the entering end of said member and the contacting surface of the socketed member being longitudinally grooved and receiving in the grooved portions of the same segments of the ridges displaced therein by the drive fit engagement of said first member in said socketed member.

HARRY E. SIPE.